(12) United States Patent
Lakhdhir

(10) Patent No.: US 8,615,545 B1
(45) Date of Patent: Dec. 24, 2013

(54) SAVING DATA FROM AN APPLET LOCALLY ON A DATA PROCESSING SYSTEM

(75) Inventor: Mansoor Abdulali Lakhdhir, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3389 days.

(21) Appl. No.: 09/671,068

(22) Filed: Sep. 28, 2000

(51) Int. Cl.
*G06F 15/16* (2006.01)
*G06F 3/00* (2006.01)
*G06F 9/44* (2006.01)
*G06F 9/46* (2006.01)
*G06F 13/00* (2006.01)

(52) U.S. Cl.
USPC ............................ 709/203; 715/749; 719/311

(58) Field of Classification Search
USPC .................. 709/203, 219, 225, 227, 228, 231
See application file for complete search history.

(56) References Cited

U.S. PATENT DOCUMENTS

| | | | | |
|---|---|---|---|---|
| 5,809,250 | A * | 9/1998 | Kisor | 709/227 |
| 5,927,050 | A * | 7/1999 | Houck et al. | 53/428 |
| 5,951,636 | A * | 9/1999 | Zerber | 709/202 |
| 5,953,005 | A * | 9/1999 | Liu | 715/500.1 |
| 6,578,101 | B1 * | 6/2003 | Ahern | 710/306 |
| 6,816,880 | B1 * | 11/2004 | Strandberg et al. | 709/202 |

* cited by examiner

*Primary Examiner* — Azizul Choudhury
(74) *Attorney, Agent, or Firm* — Yee & Associates, P.C.; Jeffrey S. LaBaw

(57) ABSTRACT

A method for saving data locally on a data processing system running a first instance of a browser. A program is received from a server with the first instance of the browser. The data is formatted in a selected format and placed into a class variable responsive to another user input. A second instance is initiated of the browser. The data is retrieved into the second instance of the browser to form retrieved data. The retrieved data is saved locally on the data processing system.

2 Claims, 9 Drawing Sheets

```
import java.net.*;
import java.util.*;

public class BrowserMemory
{
    static URL passedURL;
    static String passedData;

// setter functions...
    void setURL(URL URLtoSet)
    {
        passedURL=URLtoSet;
    }
    void setData(String setString)
    {
        passedData=setString;
    }

// getter functions...
    URL getURL()
    {
        return passedURL;
    }
    String getData()
    {
        return passedData;
    }
}
```

FIG. 7A

```
import java.text.*;
import java.net.*;
import java.io.*;
import java.awt.*;
import java.awt.event.*;
import java.util.*;
import java.awt.MediaTracker;
import java.applet.*;

public class FormatAndFeedData extends Applet
implements ActionListener
{
   boolean error=false;
   static BrowserMemory BrMem=new BrowserMemory();
   URL redirectURL=null;
   String widgetData="";
```
⎬ 702

⟵ 700

```
// .
// . <other processing code goes here>
// .
```
⎬ 704

```
// When you get an event (such as a button press on a
// "Save Data Locally" button), then process it as follows...
public void actionPerformed(ActionEvent event)
{
   // Query each widget on the applet for an HTML formatted
   // representation of the widgets' data.
   // Note: If desired, the data in each GUI control of the applet can be
   //       formatted, and then inserted into the HTML stream, such that a
   //       local application can import the applet data seamlessly.
   // Load this data into widgetData
```
⎬ 706

```
   // Next, create the HTML envelop to surround the above data stream...
   String HTMLdataStream=new String("<HTML><HEAD>"+
              "<TITLE>Your data</TITLE>"+
              "</HEAD><BODY>");

HTMLdataStream+="<P><FONT face=helvetica,arial color=000084>"+
              "<B>Data in Java applet</B>"+
              "<FONT></P>";

HTMLdataStream+="<FONT face=helvetica,arial size=2>";
```
⎬ 708

FIG. 7B

```
// Insert into this HTML formatted stream; data from each of the GUI controls...
   // NOTE: If the data in each of the GUI controls of the applet has been
   //    formatted (e.g. to allow a local application to import the applet
   //    data seamlessly), then this would result in an application specific
   //    data format imbedded within an HTML formatted data stream.
   HTMLdataStream+=widgetData;

HTMLdataStream+="</FONT></BODY></HTML>";
```
⎬ 710

```
// Load the HTML data stream into passedData variable
// in BrowserMemory.java
BrMem.setData(HTMLdataStream);
```
⎬ 712

```
// Now, launch another browser window called DataFrame.
// In this window load and run DataReceiver.html
// DataReceiver.html is a file on the same host
// that this applet was launched from.
try
{
   URL home_url=this.getCodeBase();
   redirectURL=new URL(home_url, "DataReceiver.html");
}
catch (MalformedURLException e)
{
   String errorMsg="error:"+e;
   showStatus(errorMsg);
   System.err.println(errorMsg);
   e.printStackTrace(System.err);
   error=true;
   repaint();
} if (!error)
{
   this.getAppletContext().showDocument(redirectURL, "DataFrame");
}
  }
}
```
⎬ 714

FIG. 9

```
<!--
  function showPageInNewWindow()
  {
    if(null !=document.getterapplet)
    {
      var html_data=document.getterapplet.getBrowserMemory();
      if(null !=html_data)
      {
        msgWindow.document.open();
        msgWindow.document.write(html_data);
        msgWindow.document.bgColor="FFFFCC";
        msgWindow.document.close();
        msgWindow.focus();
      }
    }
  } function newFrame()
  {
    self.blur();
    msgWindow=window.open(",
                'AppletData',
                'toolbar=yes,location=no,directories=no,
                menubar=yes,status=no,scrollbars=yes,
                resizable=yes,width=400,innerWidth=400,
                height=360',innerHeight=360,
                screenX=15,screenY=15);
    showPageInNewWindow();
    self.close();
  }
// -->
</SCRIPT>
</HEAD>
<BODY onLoad="newFrame();">

<APPLET codebase="/applet/com/con/developer/tools" code="DataRetriever.class"
name="getterapplet"
alt="To run this Java applet, you need to enable Java 1.1 in your browser."
width="3" height="3" align="middle"
HSPACE="0" VSPACE="0">
<B><FONT color="#FF0000">
To run this Java applet, you need to enable Java 1.1 in your browser.
</FONT></B>
</APPLET>
```

900, 902, 904, 906

```
import java.text.*;
import java.net.*;
import java.io.*;
import java.awt.*;
import java.awt.event.*;
import java.util.*;
import java.awt.MediaTracker;
import java.applet.*;
import java.awt.datatransfer.*;

public class DataRetriever extends Applet
implements Runnable
{
  BrowserMemory BrMem=null;

/**
   *Thread support
   */
  Thread ivRunner=null
  private static Runtime cvRunTime;

public void init()
  {
    super.init();
    cvRunTime=java.lang.Runtime.getRuntime();

} public void start()
  {
    if (null==ivRunner)
    {
      ivRunner=new Thread(this);
      ivRunner.start();
    }
  } public void stop()
  {
    ;
  } public void destroy()
  {
    if (null!=ivRunner)
    {
      ivRunner.stop();
      ivRunner=null;
    }
```

```
        cvRunTime.gc();
        cvRunTime.runFinalization();
}

/**
 * run thread
 */
public void run()
{
    ;
} public BrowserMemory getBrowserMemoryInstance()
{
    if (this.BrMem==(BrowserMemory)null)
    {
        this.BrMem=new BrowserMemory();
    }
    return this.BrMem;
}

// setter functions...
public void setURL(URL url)
{
    this.getBrowserMemoryinstance().setURL(url);
}
public void setBrowserMemory(String setString)
{
    this.getBrowserMemoryInstance().setData(setString);

}

// getter functions...
public URL getUrl()
{
    return(this.getBrowserMemoryInstance().getURL());
}
public String getBrowserMemory()
{
    return(this.getBrowserMemoryInstance().getData());
}

}
```

SAVING DATA FROM AN APPLET LOCALLY ON A DATA PROCESSING SYSTEM

BACKGROUND OF THE INVENTION

1. Technical Field

The present invention relates generally to an improved data processing system, and in particular to a method and apparatus for saving data. Still more particularly, the present invention provides a method and apparatus for saving data locally on a client machine from an unsigned applet.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name server (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Users exploring the Web have discovered that the content supported by HTML document format on the Web was too limited. Users desire an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Java is an object oriented programming language and environment focusing on defining data as objects and the methods that may be applied to those objects. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The Java run-time environment is specifically designed to limit the harm that a Java application can cause to the system that it is running on. This is especially important with the World Wide Web, where Java applets are downloaded and executed automatically when a user visits a Web page that contains Java applets. Normally, one would not want to execute random programs; they might contain viruses, or they might even be potentially malicious themselves and not merely carrying unwelcome code unintentionally. An unsigned Java applet cannot write, print, copy to clipboard, and in general cannot access the local resources of the client system. The Security Manager class implementation in all Java (JVM) enabled browsers imposes this restriction. An end-user cannot do anything to get around this restriction. The author of the Java applet may choose to attach a digital certificate from a third trusted party (e.g., VeriSign) to the applet class/jar/cab files and thus create a signed applet on the server. Then, a end-user may choose to accept the signed applet, which can then access local resources such as printers, hard-disks, clipboards, etc. An unsigned applet also cannot read or write to memory locations (except to a specific, restricted area). These applets are also referred to as unsigned or untrusted applets.

These security measures, however, prevent the use of data or the saving of the data received by the applet from a server locally within the computer on which the applet is executed. For example, an applet may represent data in the form of a chart, graph, or table. The data presented by the applet is received from a server. This data, however, cannot be used by a local client program or saved on the computer because of the security mechanisms for handling unsigned or untrusted Java applets.

As a result, an unsigned or unauthorized Java applet essentially runs in a "sandbox" environment and is unable to access many resources on a client machine. Such a situation is undesirable at times when a user wishes to save or process data locally because the unsigned applet is unable to access these resources because of the restrictions imposed by the browser.

Therefore, it would be advantageous to have an improved method and apparatus for saving data locally from an unauthorized or unsigned program, such as an applet.

SUMMARY OF THE INVENTION

The present invention provides a method for saving data locally on a data processing system running a first instance of a browser. A program is received from a server with the first instance of the browser. The data is formatted in a selected format and placed into a class variable responsive to another user input. A second instance is initiated of the browser. The data is retrieved into the second instance of the browser to form retrieved data. The retrieved data is saved locally on the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A and 7B are diagrams illustrating code in an applet for storing data to a static variable in accordance with a preferred embodiment of the present invention;

FIG. 9 is code for retrieving data from a browser memory object in accordance with a preferred embodiment of the present invention; and FIGS. 10A and 10B are diagrams illustrating code for a applet used to retrieve data from a browser memory object in accordance with a preferred embodiment of the present invention.

DETAILED DESCRIPTION OF THE PREFERRED EMBODIMENT

Figure 1:
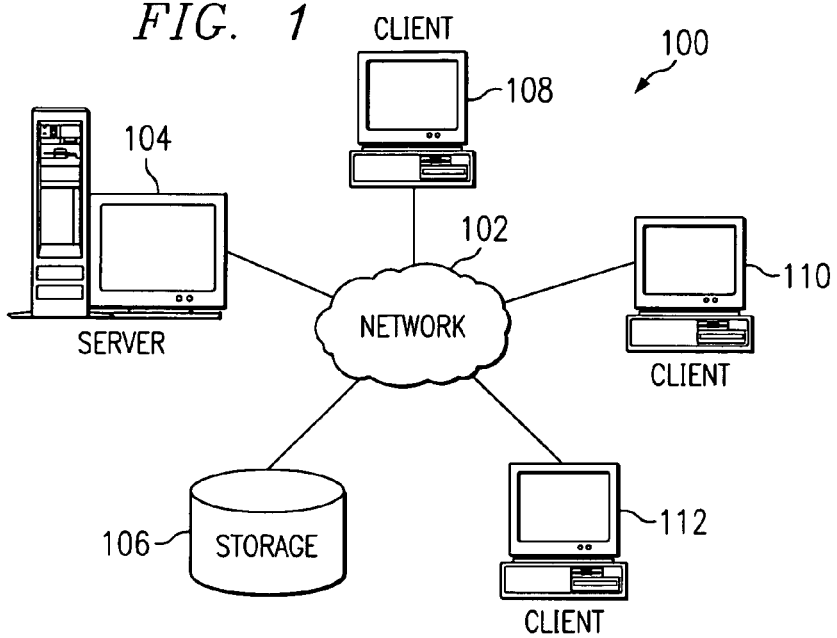
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
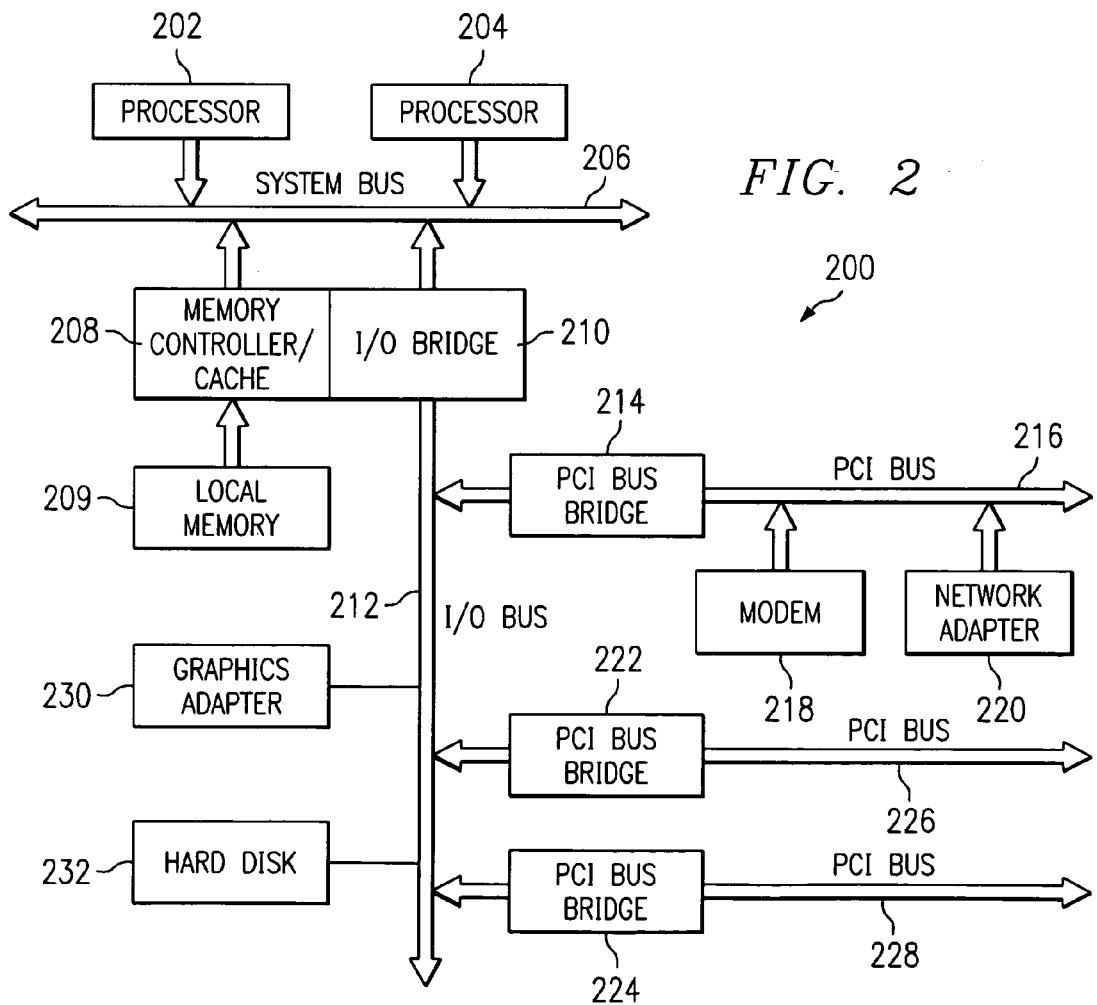
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
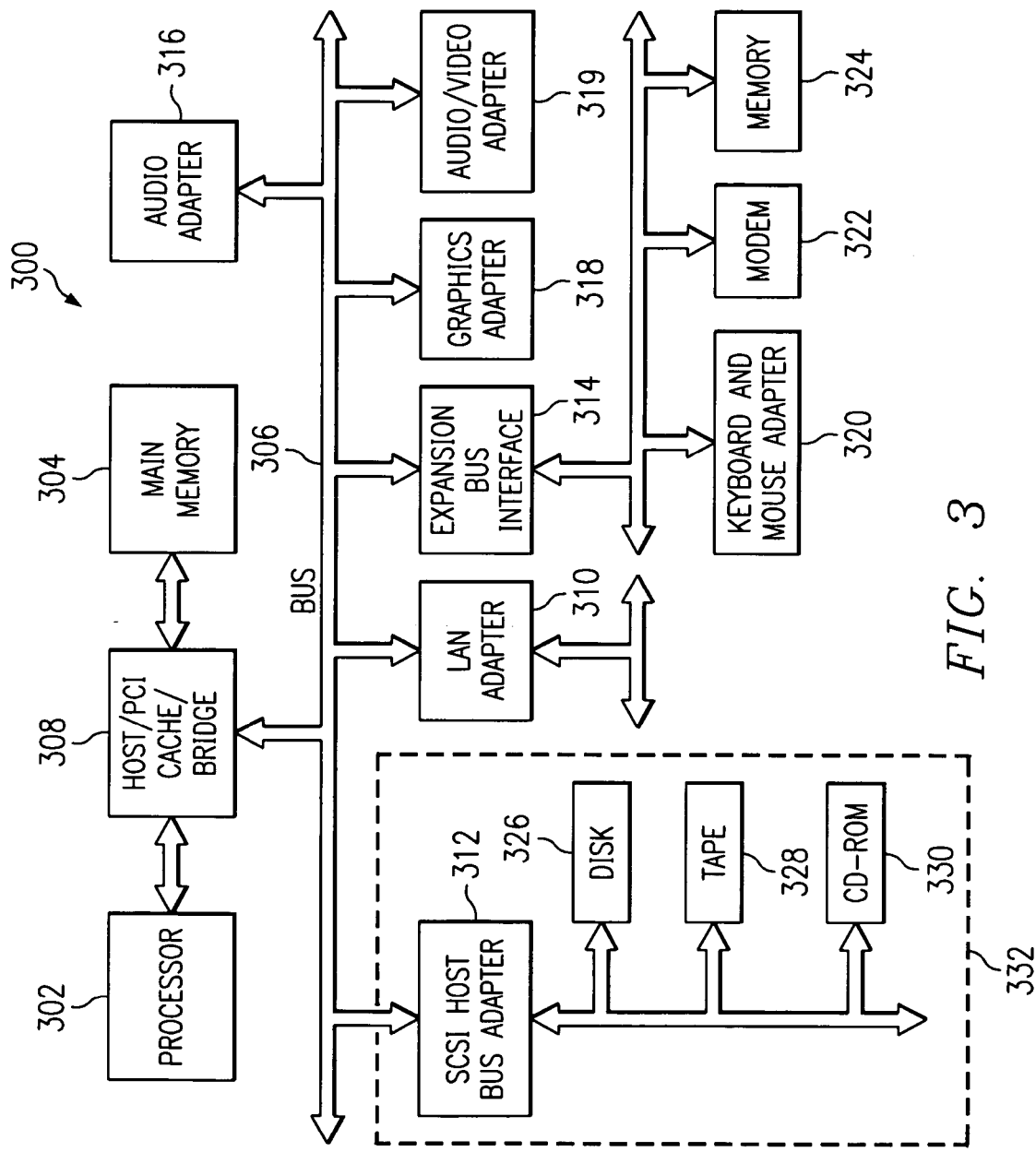
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer implemented instructions to transferring data to local storage or processing on a client. This mechanism is especially useful with unsigned or unauthorized Java applets, which are unable to access resources needed to locally store or process data. In the depicted examples, a Java applet stores the data in a static variable in a location accessible by the applet.

In these examples, the data may be encoded or formatted to a desired form and wrapped in an HTML format. For example, the data may be placed in comment section of an HTML document. The data is passed from an applet in one browser window to an applet in another browser window by using a static variable. In programming, a variable is a value that can change, depending on conditions or on information passed to the program. In Java, the "static keyword" is used to indicate that a particular variable is a class variable as opposed to an instance variable. Thus, a static variable, also known as a class variable, has only one copy of the variable associated with a Java class, rather than many copies of the variable associated with each instance of the Java class. Only one copy of the variable exists regardless of the number of instances of the class that are created. The terms static variable and class variable mean the same and can be used interchangeably.

A data type in a programming language is a set of data with values having predefined characteristics. Examples of data types are: integer, floating point number, character, string, and pointer. A class or static variable can have all the data types that an instance variable can have. The 'static' keyword modifier makes the variable a class variable as opposed to an instance variable.

This applet is executing in a first window, frame, or instance of a browser. A browser is a program used to view web pages and any associated data. In these examples, the browser is a web browser, such as, for example, Internet Explorer from Microsoft Corporation. A second window is opened. This second window includes a program, which is a JavaScript, which retrieves the data from the static variable by invoking a small applet in the second window. The data in the second window may be stored on the local storage and used for local processing on the client. The saving of the data may take the form of using a save option in the second window of the browser.

Figure 4:
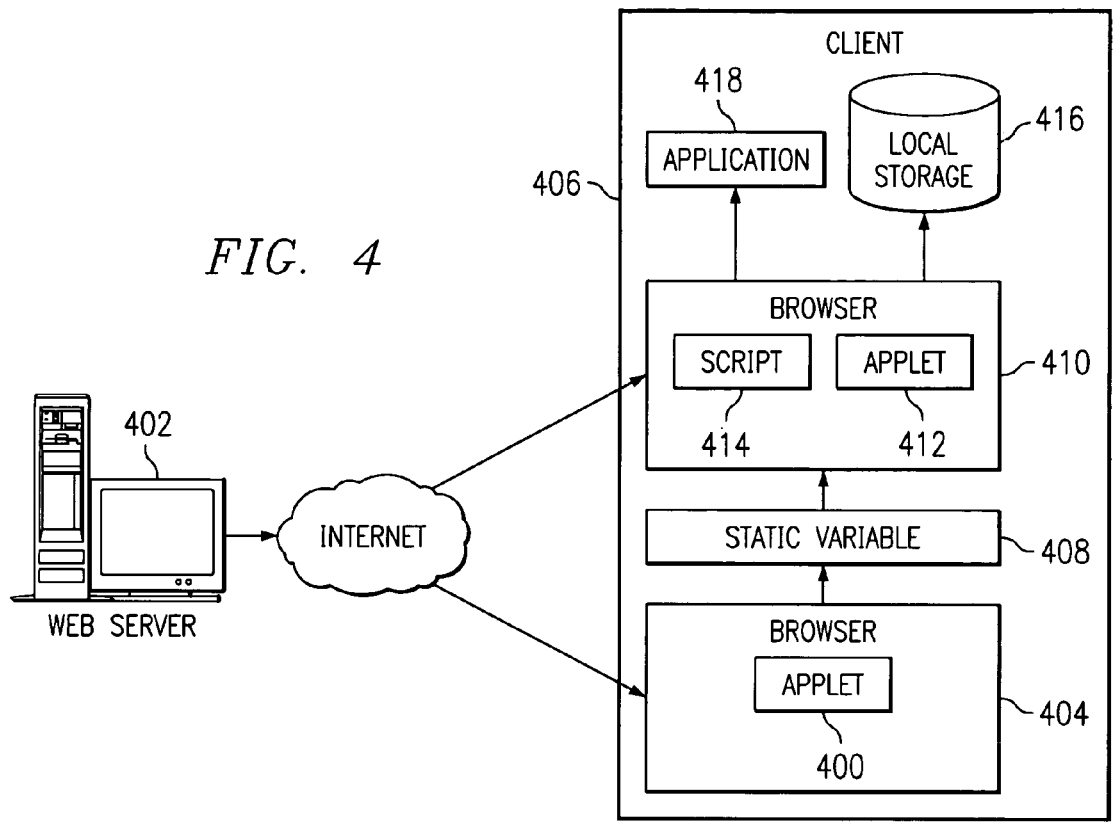
FIG. 4 is a diagram of a components and data flow used to save data in accordance with a preferred embodiment of the present invention.

Turning next to FIG. 4, a diagram of a components and data flow used to save data is depicted in accordance with a preferred embodiment of the present invention. In this example, applet 400 is downloaded from web server 402 onto web browser 404 on client 406. Applet 400 is an unsigned applet and is unable to access some resources on client 406. Applet 400 runs in the JVM of the browser, which is a "sandbox" environment, and is not allowed to access the local resources (printer, clipboard, hard-disk, etc.) on client 406.

When user input is received to store or process data locally, applet 400 formats the data for use by client 406 and creates an HTML representation of the data. In other words, the data is wrapped in an HTML form. In these examples, if data needs to be formatted for import by a particular client application or device, the data can be placed in the comment portions of the HTML document, or it can be placed as HIDDEN FORM fields in the HTML document. This wrapped data is placed in a static or class variable 408, which is located in a location accessible by applet 400.

Thereafter, applet 400 causes browser 410 to be launched. Browser 410 is another window instance of the browser 404. Browser 410 includes an applet 412 used to retrieve the encoded data from static variable 408. JavaScript 414 in browser 410 calls a "getter" function in applet 412 to retrieve and display the data and, optionally, display instructions to the user to save the data. At this point, the user may use a save as menu option in browser 410 to send the data to local storage 416. Alternatively, depending on the implementation, the data may then be sent from browser 410 to application 418 on client 410 for processing.

Figures 5, 8:
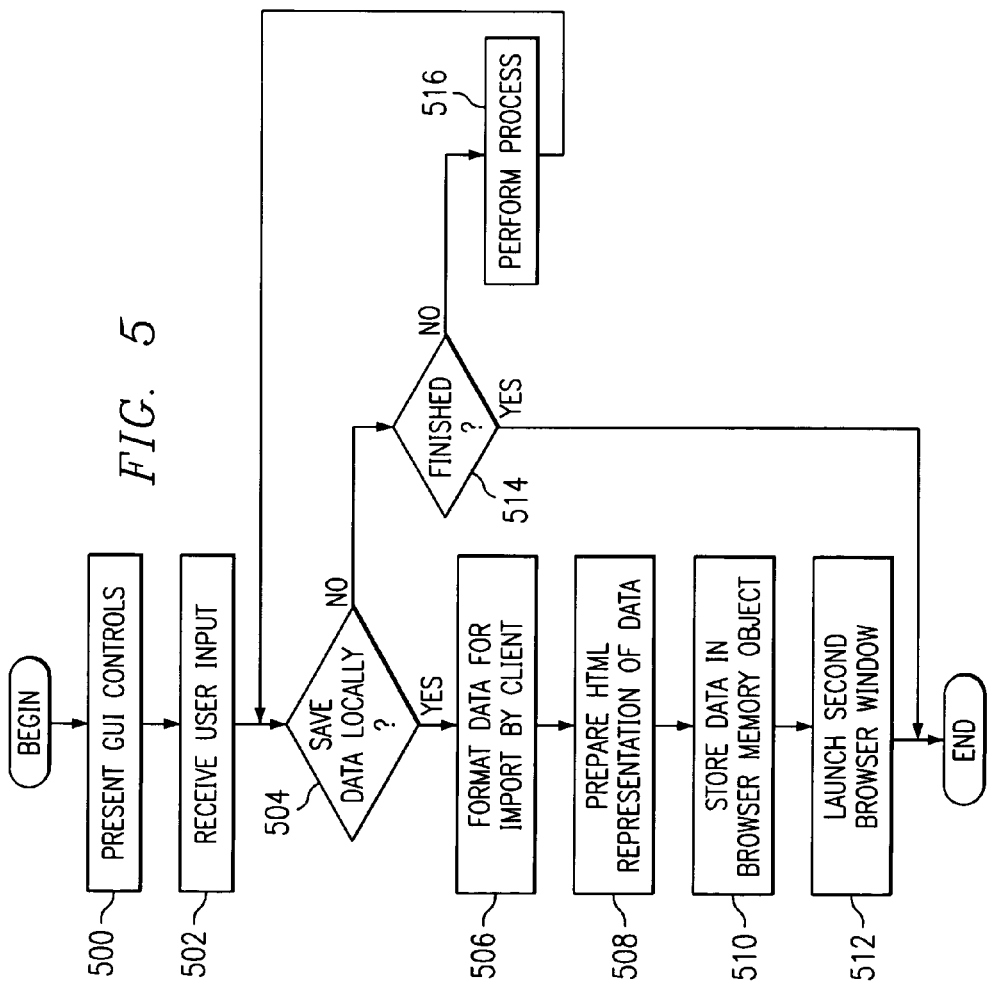
FIG. 5 is a flowchart of a process used to save data to a static variable in accordance with a preferred embodiment of the present invention.
FIG. 8 is an example of a browser memory object in accordance with a preferred embodiment of the present invention.

Turning next to FIG. 5, a flowchart of a process used to save data to a static variable is depicted in accordance with a preferred embodiment of the present invention. This process is implemented in an applet, such as applet 400 in FIG. 4.

The process begins by presenting graphical user interface (GUI) controls in the browser (step 500). Thereafter, user input is received (step 502). A determination is made as to whether the user input is to save data or process data locally (step 504). If the data is to be saved or used locally, then the data is formatted for import by the client (step 506). This formatting may include adding the appropriate tags to the data, for import of the data, by the client application or device. An example is a Quicken Interchange Format (QIF) file which is used by the Quicken 2000 product by Intuit, Inc. as shown below:
!Type:Bank
D11/30/98
U12,004.80
T12,004.80
PTransfer Money—Shares moved to datek
L[etrade securities—Cash]

Next, an HTML representation of the data is prepared (step 508). If tagged data is present, for import by a client application or device, this tagged data can be placed, for example in HTML comment fields or as HTML HIDDEN FORM fields. The data is then stored in a browser memory object (step 510). In these examples, the browser memory object is a static or class variable. Thereafter, a second browser window is launched (step 512) with the process terminating thereafter.

With reference again to step 504, if the data is not to be saved locally, then a determination is made as to whether processing has finished (step 514). If processing has not finished, then the process or function identified by the user input is performed (step 516) with the process then returning to step 504. This other processor function may be, for example, manipulating presentation of the data by the applet. If processing is finished in step 514, then the process terminates.

Figure 6:
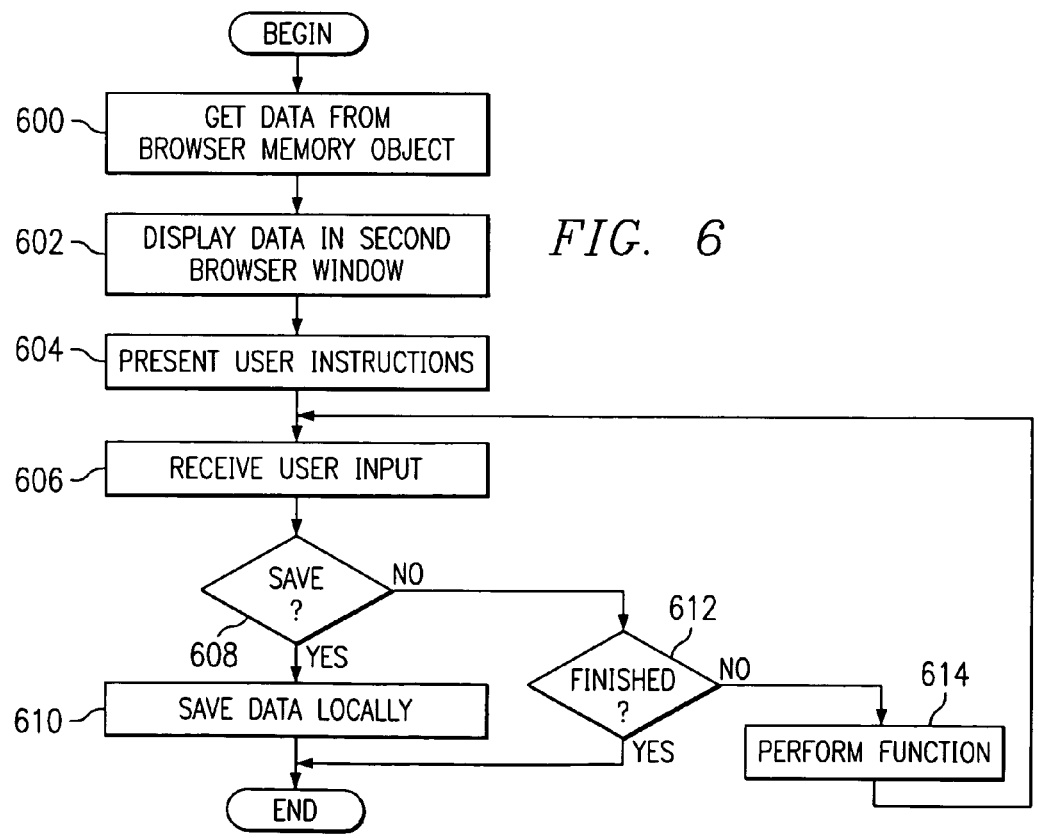
FIG. 6 is a flowchart of a process used for retrieving data from a static variable and saving the data locally in accordance with a preferred embodiment of the present invention.

Turning next to FIG. 6, a flowchart of a process for retrieving data from a static or class variable and saving the data locally is depicted in accordance with a preferred embodiment of the present invention. In this example, the process illustrated in FIG. 6 may be implemented in applet 412 and JavaScript 414 in FIG. 4. This process is initiated in response to the loading or initiation of the second browser window in step 512 in FIG. 5.

The process begins by JavaScript 414 calling a function in applet 412 which obtains the data from the browser memory object (step 600). The data is then displayed in the second browser window (step 602). Next, user instructions are presented (step 604). This step is an optional step and may be used to provide a user with instructions as to how to save the data or to provide the user with an indication as to the format of the data. Thereafter, user input is received (step 606). A determination is then made as to whether the data is to be saved (step 608). If the data is to be saved, the data is then saved locally (step 610) with the process terminating thereafter. Alternatively, the data could be imported directly to an application on the client for processing.

With reference again to step 608, if the user input is not to save the data, a determination is made as to whether processing is finished (step 612). If processing has not finished, then the function identified by the user input is performed (step 614) with the process then returning to step 606. Otherwise, the process terminates.

Turning next to FIGS. 7A-10B, diagrams illustrating code segments for saving or processing data locally is depicted in accordance with a preferred embodiment of the present invention. The code segments in these figures illustrate sample code for storing data in a static variable and retrieving the data for storage locally on a client.

In FIGS. 7A and 7B, a diagram illustrating code in an applet for storing data to a static or class variable is depicted in accordance with a preferred embodiment of the present invention. Code 700 is for a FormatAndFeedData.java file in which code 700 represents an unsigned Java applet. In this example, code 700 is in Java. Section 702 contains code for initializing variables. Section 704 contains code for processing and presenting data by the applet. Section 706 is used to place data in a tagged format for a specific client application or device. Section 706 is optional. If only plain text representation of the applet data is desired, then section 706 may be omitted. Section 708 creates an HTML envelope to surround the data stream. Section 708 may include HTML comments sections or HTML HIDDEN FORM fields for receiving the tagged data from section 706. This envelope is used to receive the formatted data. Section 710 is used to place the data into the HTML data stream. Section 712 is used to store the HTML data stream in a static variable. Section 714 is used to launch a second browser window for further processing of the data.

Turning next to FIG. 8, an example of a browser memory object is depicted in accordance with a preferred embodiment of the present invention. Code 800 represents a BrowserMemory.java file for a browser memory object. This object contains a static or class variable called passedData. In this example, code 800 is in Java. This static variable passedData is used to store the HTML data stream created by code 700 in FIGS. 7A and 7B.

Turning next to FIG. 9, code for retrieving data from a browser memory object is depicted in accordance with a preferred embodiment of the present invention. Code 900 includes JavaScript code, which calls a Java applet called DataRetriever.java in section 902 in this example. The applet is called getterapplet. The JavaScript in code 902 calls a function getBrowserMemory( ) in DataRetriever.java to retrieve the HTML encoded data stream stored in the browser memory object in the static variable called passedData. Next, this HTML encoded data stream is displayed in the secondary browser window. In section 904, the JavaScript prepares the "adornments" (size of window, absence or presence of toolbar, menubar, scrollbars, etc.) for the second browser window and calls the JavaScript function showPageInNewWindow( ) in 902. Section 906 shows the typical inclusion of a Java applet in an HTML page. The initial class file of this applet is DataRetriever.class, which is the Java complied bytecode of DataRetriever.java. The DataRetriever.class file is located and loaded by the class-loader of the JVM, from the same host, in this case, as applet 400. The "codebase" URL parameter defines the exact directory on the server to locate and download DataRetriever.class file from. This applet is named getterapplet, which allows it to be referenced and called by the JavaScript function showPageInNewWindow( ) as shown in section 902. In this example, the display size of this applet is 3 by 3 pixels, and is intentionally kept minute, to conceal it on the initial display of browser window 410. This display size, of this applet, is denoted by width="3" and height="3" in section 906.

Turning next to FIGS. 10A and 10B, a diagram illustrating code for a applet used to retrieve data from a browser memory object is depicted in accordance with a preferred embodiment of the present invention. In this example, code 1000 is in Java. Code 1000 represents code for a DataRetriever.java file used to retrieve data from a browser memory object, which contains a static or class variable named passedData as shown in section 800.

Thus, the present invention provides an improved method, apparatus, and computer implemented instructions for locally saving or processing data from an unsigned or unauthorized applet. This advantage is provided by storing data wrapped in an HTML format in a static or class variable located in memory accessible by the applet. A second browser window or instance of a browser is launched in which this window or instance includes a program for retrieving the data from the static variable. The data is retrieved into this window. Depending on the formatting, the data may not actually be visible to the user. At this time, the user is able to save the data or export the data for local processing or storage. This mechanism avoids the need for using signed applets and does not require removing the security provisions present in the browser.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the depicted illustrations used Java and JavaScript to implement the processes of the present invention. These processes could be implemented in other forms or languages depending on the particular implementation. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for saving data locally on a data processing system running a first instance of a browser, the method comprising:
   receiving an unsigned program from a server with the first instance of the browser, the unsigned program being a program that is unable to write files on the data processing system;
   responsive to a user input to the unsigned program, (i) formatting the data generated by the unsigned program in a selected format by wrapping the data in an HTML document, (ii) placing the data into a class variable using the first instance of the browser running on the data processing system, and (iii) initiating a second instance of the browser on the data processing system, the class variable being a variable that is accessible by a plurality of browser instances running on the data processing system and only one copy of the class variable exists regardless of a plurality of instances of the browser that are running on the data processing system;
   retrieving the data from the class variable into the second instance of the browser to form retrieved data, wherein the second instance of the browser includes a second program to retrieve the data from the class variable; and
   saving the retrieved data locally on the data processing system using the second instance of the browser, wherein the second instance of the browser enables the saving data locally that is otherwise precluded from being saved locally by the unsigned program, wherein the unsigned program is unable to access non-volatile storage device resources on the data processing system.

2. A data processing system for saving data locally on a data processing system running a first instance of a browser, the data processing system comprising a data processor coupled to a memory having program code stored therein that is executable by the data processor to perform steps of:
   receiving an unsigned program from a server with the first instance of the browser, the unsigned program being a program that is unable to write files on the data processing system;
   responsive to a user input to the unsigned program, (i) formatting the data generated by the unsigned program in a selected format by wrapping the data in an HTML document, (ii) placing the data into a class variable using the first instance of the browser running on the data processing system, and (iii) initiating a second instance of the browser on the data processing system, the class variable being a variable that is accessible by a plurality of browser instances running on the data processing system and a single copy of the class variable exists regardless of a plurality of instances of the browser that are running on the data processing system;
   retrieving the data from the class variable into the second instance of the browser to form retrieved data, wherein the second instance of the browser includes a second program to retrieve the data from the class variable; and
   saving the retrieved data locally on the data processing system using the second instance of the browser, wherein the second instance of the browser enables the saving data locally that is otherwise precluded from being saved locally by the unsigned program, wherein the unsigned program is unable to access non-volatile storage device resources on the data processing system.

* * * * *